Feb. 18, 1947. S. G. ISSERSTEDT 2,416,257
LOAD COMPENSATING FOLLOW-UP SYSTEM
Filed March 26, 1943
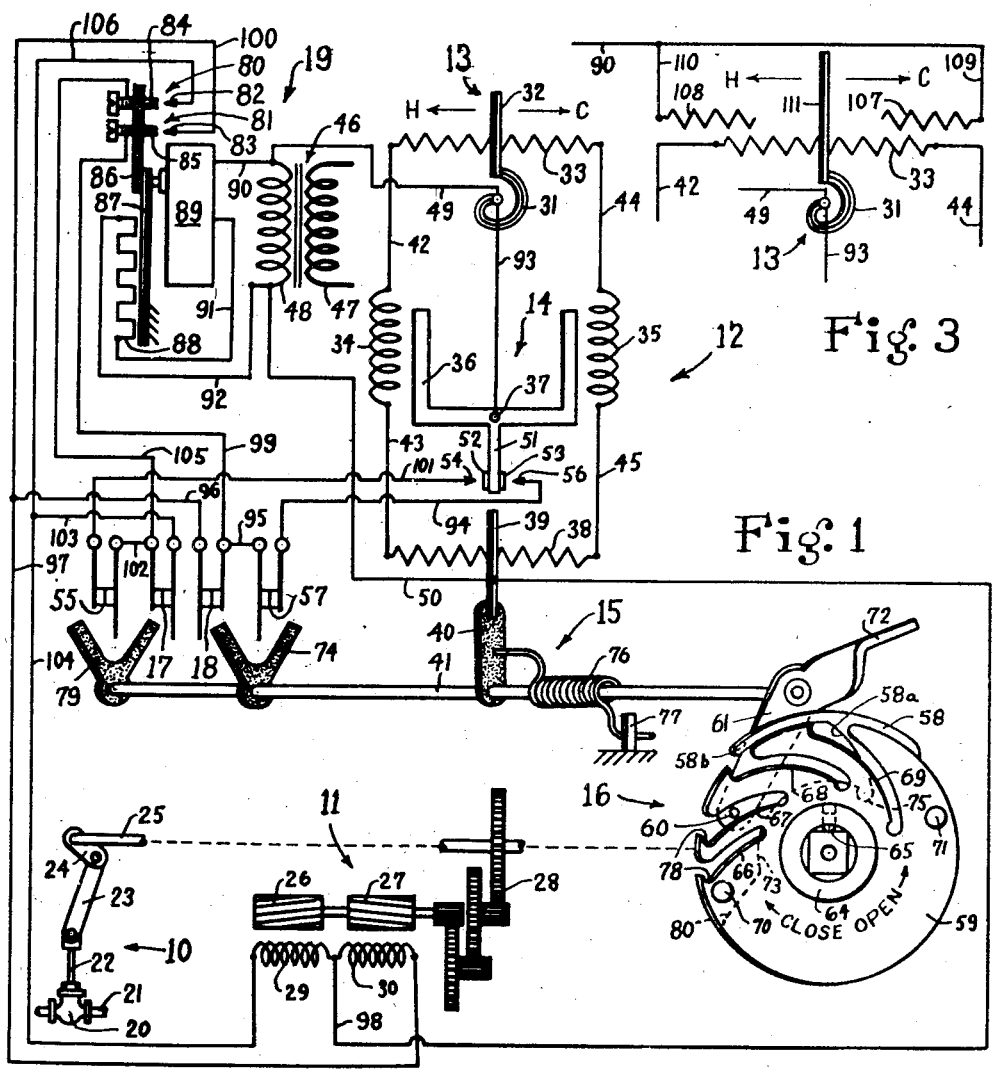
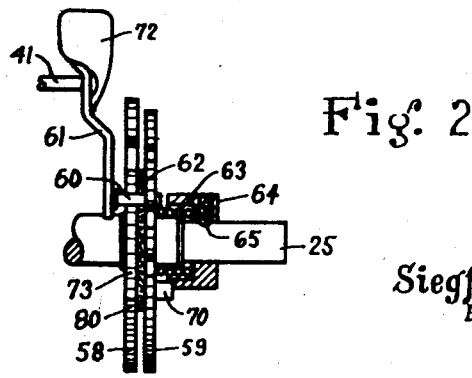
INVENTOR.
Siegfried G. Isserstedt
BY George H. Fisher
ATTORNEY Patented Feb. 18, 1947

2,416,257

UNITED STATES PATENT OFFICE 2,416,257

LOAD COMPENSATING FOLLOW-UP SYSTEM

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,670

12 Claims. (Cl. 172—239)

This invention relates to the condition control art, but more particularly to improvements in load compensation means as applied to a follow-up control system for maintaining the value of the condition controlled at a substantially constant value regardless of changes in load.

It is a well known fact that follow-up systems operate satisfactorily as long as the load on the system varies within narrow limits, but that either a characteristic "hunting" or "drooping" condition results when the load on the system varies substantially unless means are provided for compensating for load changes. Since the capacity of the condition changing means must be commensurate with variations in the load on the system, it follows that the amount of adjustment of the condition changing means per unit deviation of the condition from the desired value will be large if the condition is to be maintained within narrow limits, or in other words, if the system is to operate on a narrow differential. Under such conditions, "hunting" in the system is certain to occur, especially if the time lag, which is present to a greater or lesser extent in all condition control systems, is appreciable. On the other hand, if the differential is widened to obviate the "hunting" condition, accurate control of the desired value is sacrificed, and a "drooping" of the control point results.

A broad object of the present invention is to provide an improved load compensation means for a follow-up control system whereby "drooping" and "hunting" in the system is substantially obviated.

Another object of the invention is the provision of means for maintaining a narrow differential in a follow-up control system which is subjected to a substantially varying load without incurring the "hunting" condition referred to hereinabove.

A further object of the invention is to provide means for varying the amount of adjustment of the condition changing means per unit deviation of the condition from its desired value without changing the differential of the system and without incurring the "drooping" condition referred to hereinabove.

More specifically, it is an object of this invention to provide means whereby the condition changing means is adjusted through but a fraction of its range of adjustment when the condition controlled varies over a predetermined range of values corresponding to the differential of the system.

Another object of the invention is to provide manually selective means whereby the condition changing means may be adjusted through any one of a plurality of percentages of its total range of adjustment when the condition controlled varies between the limits of the differential of the system.

A further object of the present invention is to provide a modulating motor structure for adjusting the condition changing means to an extent proportional to the deviation of the condition from the desired value thereof over a fraction of its range of adjustment corresponding to the differential of the system, and to provide a thermal timing means associated with the modulating motor structure for additionally adjusting the condition changing means to thereby provide a reset of the condition changing means with respect to the differential upon a departure of the condition value from the differential as a result of substantial load changes on the system.

An additional object of the present invention is the provision of a timing means for resetting the condition changing means with respect to the differential of the system, and means responsive to variations in the value of the condition for varying the timing rate of the timing means in proportion to the deviation of the condition from the desired value thereof.

Other objects and advantages will become manifest upon a reading of the following specification, reference being had to the accompanying drawings, in which Figure 1 is a diagrammatic view of the improved load compensating control system, Figure 2 is a detail view of the reset mechanism as viewed from the left in Figure 1, and in which Figure 3 is a diagrammatic view of a means for varying the timing rate of the timing means of Figure 1.

Referring to Figures 1 and 2, the numeral 10 generally designates a means for changing the value of a condition to be controlled. A means for adjusting the condition changing means 10 generally refers to a proportioning system which includes a motor generally indicated by the numeral 11, and a proportioning circuit generally indicated by the numeral 12. The proportioning circuit 12 includes a condition responsive means 13, a normally balanced relay 14, and a follow-up mechanism, generally indicated by the numeral 15. The arrangement of the circuit 12 is such that the condition responsive means 13 responds to variations in the condition controlled to unbalance the relay 14 which initiates operation of the motor 11 to adjust the condition changing means 10 in proportion to the deviation of the means 13 from the desired control point. The follow-up mechanism 15 is also driven by the motor 11 to restore the balance of the relay 14 to terminate operation of the motor 11. The numeral 16 generally designates the operative connections between the motor 11 and the follow-up mechanism 15. As will hereinafter appear, the connections 16 provide means whereby the follow-up mechanism is driven through its full range of travel when the condition changing means moves through but a fraction of its complete range of movement. The connections 16 also provide a means for manually selecting any one of a plurality of connections providing different amounts of adjustment of the condition changing means per unit deviation of the condition controlled to be described in greater detail hereinafter. When the follow-up mechanism 15 is driven to the limit of its travel, it operates switches 17 and 18 to terminate operation of the motor 11. A timing means, generally indicated by the numeral 19, is provided for intermittently shunting the switches 17, 18 to provide additional adjustment of the condition changing means 10 to thereby reset the same with respect to the differential of the system in a manner also later to be described.

While it is contemplated that this invention may be well adaptable for controlling any condition value, for purposes of disclosure a temperature control system has been selected as being best illustrative of the principles involved.

The condition changing means 10 is shown to be a valve 20 which controls the flow of a heating fluid through a pipe line 21 which communicates with a space, not shown, to be maintained within narrow temperature limits. The valve is regulated by a stem 22 connected by a link 23 with a crank arm 24 secured to the operator shaft 25 of the motor 11. The shaft 25 is driven by rotors 26, 27 through a suitable reduction gear train 28. The rotors, in turn, are driven by windings 29 and 30. The arrangement of the motor 11 is such that when the winding 29 is energized, the valve 20 is driven in a direction to close the same, whereas when the winding 30 is energized, the valve 20 is driven in a direction to open the valve.

The condition responsive means 13 is shown to be a thermostat comprising a bimetallic strip 31 to which is attached an arm 32. The arm 32 wipes across a resistance 33, the arm and resistance together constituting a potentiometer. When the arm 32 is mid-way between the ends of resistance 33, the temperature of the space is at the desired value. As the temperature falls below this value, the element 31 moves the arm 32 to the right in the direction of legend C and when the temperature rises above this value, the arm 32 moves in the direction of legend H.

The relay 14 comprises relay coils 34 and 35 and a U-shaped armature 36 influenced thereby pivotally mounted for rotation about the pivot 37.

The follow-up means 15 comprises a resistance 38 and a wiper arm 39 therefor, the two together comprising a second potentiometer. The arm 39 is carried by a suitable strip of insulation material 40 which, in turn, is secured to a shaft 41 for rotation therewith. The shaft 41 is mounted for rotation in either direction.

Relay coil 34 is connected to the left end of resistance 33 by a conductor 42 and to the left end of resistance 38 by a conductor 43. Relay coil 35 is connected to the right end of resistance 33 by a conductor 44 and to the right end of resistance 38 by a conductor 45.

The proportioning circuit 12 is energized by a transformer generally designated by the numeral 46, of which the primary winding 47 is connected to a suitable source of power, not shown. The top side of the secondary winding 48 is connected to the bimetal element 31 by a conductor 49 and the lower side of the secondary 48 is connected to the wiper arm 39 by a conductor 50. By these connections with the transformer 46, it is seen that the circuit 12 is divided into two parallel impedance paths and that the wiper arms 32 and 39 act as impedance dividers to unequalize the energization in the paths when the arm 32 moves off its center position and to rebalance the energization in the paths when the arm 39 moves in an opposite direction off its center position.

Armature 36 is provided with a switch blade 51 which carries movable contacts 52 and 53. When the relay coil 34 is energized, more than coil 35, the armature 36 is actuated clockwise and the contact 52 engages a fixed contact 54 to complete a circuit to the motor winding 29 through a switch 55, and switch 17. When the relay coil 35 is energized more than the coil 34, the armature 36 swings counterclockwise and contact 53 engages a fixed contact 56 to complete a circuit to the motor winding 30 through a switch 57 and switch 18.

The operative connections 16 comprise a pair of cams 58 and 59 and a follow-up pin 60 therefor. The pin 60 is mounted for rotation with the shaft 41 being carried by an arm 61 suitably secured to the shaft 41. The cam 58 is suitably secured to the motor operator shaft 25, and the cam 59 is frictionally driven by the cam 58. For this purpose, a disc 62 of suitable friction material such as cork is inserted between the cams 58 and 59. The cam 59 is yieldably urged into engagement with the disc 62 by a coil spring 63 inserted between the cam 59 and a collar 64 conveniently formed to receive the spring 63. The collar 64 is securely held in the desired position on the shaft 25 by a set screw 65, which engages the flat portion of the shaft 25. The cam 59 is provided with a plurality of indentations each of which comprises a cam curve 66, 67, 68 and 69 engageable with the follower pin 60. The cam 59 is provided with a pair of knobs 70, 71, by means of which the cam may be manually frictionally moved with respect to the cam 58 so that any one of the indentations may be aligned with the path of movement of the follower pin 60. The arm 61 is provided with a handle portion 72 so that the arm may be manually moved to enter the pin 60 into the indentations.

The arrangement of the several cam curves 66, 67, 68 and 69 is such that the engagement of the follower pin 60 with each provides movement of the wiper arm 39 over the entire length of resistance 38 upon movement of the cam 59 causing movement of the pin 60 across the entire length of each of the cam curves. Since the several cam curves are of different lengths, it is obvious that each will produce a different adjustment of the valve 20 when the wiper arm 39 has moved its full travel.

In practice, the cam curve 66 is designed to provide approximately a 12½% adjustment of the valve 20, the curve 67 provides approximately a 25% adjustment, curve 68 provides approximately a 33%, and cam curve 69 provides approximately a 50% adjustment of the valve 20 for full travel of arm 39. Thus, by this arrangement, an 8% movement of the wiper arm 39 which, of course, is caused by an 8% movement of the wiper arm 32, provides a 1% adjustment of the valve 20 when the follower pin 60 is engaged with the cam curve 66, a 2% adjustment for operation on the cam curve 67, a 3% adjustment for operation on the cam curve 68, and a 4% adjustment for operation on the cam 69.

From the foregoing, it is obvious that if the thermostat 13 is set up at very narrow limits—in other words, if the differential of the system is very small—an appreciable departure of the wiper arm 32 from its center position provides but a fractional adjustment of the valve 20 when the operative connections 16 are used, as compared with the relatively greater adjustment which results when a full sweep of the wiper arm 39 causes a full adjustment of the valve 20. Accordingly, the adjustment of the valve 20 is eight times as sensitive when the system is operated on the cam curve 66, for example, and the danger of overshooting the desired control point is obviated, since each correction of the valve is small as compared with the corresponding movement of the wiper arm 32. It will also be obvious that the connections 16 provide, in effect, a differential adjustment of the thermostat 13, since by manually adjusting the follower pin from engagement with one cam curve to another, the amount of valve adjustment per unit movement of the thermostat is varied.

The profile of the cam 58 appears in Figure 1, appearing partly in full and partly in dotted lines. The inner periphery 73 of the cam 58 projects slightly above the inner end of the cam curves 66, 67, 68 and 69 and accordingly prevents the follower pin from reaching the end of the curves, at which point the shaft 41 has been rocked sufficiently such that an abutment 74 carried by the shaft engages the switch 18 to open the same. Upon further operation of the motor 11 caused by a shunting of the switch 18 by the timing means 19, the cam 58 moves frictionally with respect to the cam 59 until an indentation 75 on the inner periphery 73 of cam 58 aligns itself with the inner end of the cam curve with which the follower pin 60 is in engagement. At this time, the shaft 41 which is biased in a counter-clockwise direction by a spring 76, secured at one end to the insulation piece 40 and anchored at the other end to a suitable stop 77, causes the pin to move into the indentation 75. This additional movement of the shaft 41 causes the abutment 74 to actuate the switch 57, thus terminating operation of the motor at the fully closed position of the valve 20. The other end of each of the cam curves 66, 67, 68 and 69 is each formed into a hook-shape 78. When the follower pin 60 engages the end 78, further movement of the cam 59 in a clockwise direction is prevented. At this time the shaft 41 has rotated sufficiently in a clockwise direction so that an abutment 79 carried by the shaft 41 engages the switch 17 to open the same. Continued operation of the motor 11 by the timing means 19 provides frictional movement of the cam 58 with respect to the cam 59 until an edge 80 on cam 58 engages the pin 60 to provide additional clockwise movement of the shaft 41. Abutment 79 then moves into engagement with switch 55 to open the same and terminates operation of the motor 11 at the fully opened position of the valve 20.

In practice, it has been found that when the follower pin 60 is engaged with the cam curve 69 at a time when the cam 58 is in such a position that the edge 58a of the cam 58 engages the follower pin before the pin is driven to the inner end of the cam curve 69, that the cams 58 and 59 cooperate to shear the pin 60. To prevent engagement of the pin with the curve 69 when the cam 58 is in this position, a peripheral finger 58b is provided on the cam 58 which extends with the path of movement of the pin 60. Thus, the motor 11 must first be operated to drive the cam 58 sufficiently clockwise before the pin 60 may be inserted into engagement with the curve 69.

The timing means 19 comprises a pair of switches 80 and 81 comprising fixed and movable contacts 82 and 83 and 84 and 85, respectively. The fixed contacts are carried by a strip of suitable insulation material 86 which is carried by the free end of a bimetallic strip 87 suitably anchored at the other end. Associated with the strip 86 is a heater 88 which is energized by transformer 46. As the strip 87 moves to the right under the influence of the heater 88, it actuates a switch 89 to de-energize the heater. Since it is desirable that the strip 86 move with a snap action, the switch 89 is of the self-return type, in which a greater force is required to actuate the switch than to maintain it in its actuated position. Switch 89 may be substantially of the same type as described in the copending application of Albert E. Baak, Serial No. 307,991, filed Dec. 7, 1939. The heater 88 and switch 89 are connected in series with the secondary 48 of the transformer by a circuit which may be traced as follows: From the upper side of the secondary 48 of the transformer through a conductor 90, switch 89, a conductor 91, the heater 88, and a conductor 92 back to the lower side of the transformer 48. With each movement of the strip 86 to the right, the switches 80 and 81 are closed to shunt the switches 17 and 18, respectively.

From the foregoing description, the operation of Figures 1 and 2 should now be apparent. With the parts in the positions as shown, the temperature of the space is substantially at the desired value and the heat supplied to the space by the valve 20 exactly offsets the heat losses from the space. The valve 10 is adjusted to approximately 33% of its fully opened position, and since the follower pin 60 is engaged with the cam curve 67, when the temperature moves between the limits of the differential of the system, the valve 10 will be adjusted approximately 20% and 45% of its fully opened position.

Assume now that the load on the system increases, the temperature in the space will drop, causing the wiper arm 32 of thermostat 13 to move to the right in the direction of legend C. It should here be pointed out that the resistances 33 and 38 comprise parts of standard potentiometers in which a consecutive 3% movement of the wiper arms 32 and 39 is sufficient to unbalance and balance the circuit 12. Thus, the potentiometers provide thirty such 3% movements over their full travel. For each potentiometer movement there is a corresponding ¾% movement of the valve 20, and accordingly, there are 30 such ¾% movements of the valve 20 over a 25% adjustment of its range. Therefore, upon a 3% movement of the wiper arm 32 in the direction of legend C, causing an unbalance of circuit 12, relay coil 35 becomes more energized than relay coil 34, causing armature 36 to rotate in a counter-clockwise direction, whereupon contact 53 engages contact 56 to complete a circuit to the motor coil 30 as follows: from a top side of the secondary 48 through conductor 49, a conductor 93, switch blade 51, contacts 53 and 56, a conductor 94, switch 57, a conductor 95, switch 18, a conductor 96, a conductor 97, motor winding 30, conductor 98, and conductor 50 back to the secondary 48. Motor 11 then operates to open the valve 20 an additoinal ¾%, the shaft 25 moving in a counter-clockwise direction, as indicated by the legend "open" on the cam 59. After a lapse of time determined by the lag in the system, the thermostat 13 will feel the effect of the additional heat supplied to the space. Assume, however, that the adjustment of valve 20 has not been sufficient to cause an increase in the temperature of the space, and assume further that the temperature continues to drop, causing the wiper arm 32 to move to the right end of resistance 33. Since the wiper arm 39 is prevented from reaching the left end of resistance 38, because the follower pin 60 engages the inner periphery 73 of cam 58, the wiper arm 39 is prevented from balancing the circuit 12 at the last position of the wiper arm 32 to terminate operation of the motor 11. As previously described, however, at this time the abutment 74 engages the switch 18 to open the same and break the circuit to motor winding 30. If switch 81 of the timing means 19 is not closed at this time, further operation of the motor 11 terminates. On the next cycle of the timing means 19, however, a new circuit for energizing motor winding 30 is established through switch 81 as follows: from the top side of secondary 48 through conductor 49, conductor 93, switch blade 51, contacts 53, 56, conductor 94, switch 57, conductor 95, a conductor 99, contacts 85, 83, a conductor 100, conductor 97, motor winding 30, conductor 98, and conductor 50 back to secondary 48. Motor 11 then operates to an extent proportional to the timing rate of the timing means 19. It is obvious that the timing means 19 may be conveniently adjusted by suitable means, not shown, such that the "on" period of the switch 81 is of sufficient duration to provide a suitable additional adjustment of the valve 10, and the "off" period of the switch corresponds approximately to the time lag in the system. Upon a continuous drop in temperature, the timing means 19 causes continuous intermittent operation of the motor 11, causing frictional movement of the cam 58 with respect to the cam 59 until the indentation 75 in the periphery 73 of cam 58 becomes aligned with the inner end of cam curve 67, whereupon follower pin 60 moves inwardly under the biasing action of spring 76. With this additional movement of shaft 41, the abutment 74 engages the switch 57 to break the circuit to motor winding 30 through switch 81. It should here be pointed out that the actuation of switch 57 occurs only in cases of extreme changes in the weather or during pick-up periods, and that under ordinary conditions the capactiy of valve 20 is commensurate with the load on the system. Accordingly, at some point before the valve 10 reaches its fully opened position, the heat supplied to the space is more than sufficient to satisfy the heat losses therefrom, thus causing a rise of temperature in the space.

Upon the rise in temperature, the wiper arm 32 is moved sufficiently far to the left to produce an unbalance of circuit 12 in which the relay coil 34 is energized more than the relay coil 35, causing clockwise rotation of the armature 36 and engagement of contacts 52 and 54. This completes a circuit to motor winding 29 as follows: From the top side of secondary 48 through conductors 49, 93, switch blade 51, contacts 52, 54, a conductor 101, switch 55, a conductor 102, switch 17, a conductor 103, a conductor 104, motor winding 29, conductor 98 and conductor 50 back to secondary 48. Motor 11 then operates causing valve 10 to move ¾% towards its closed position, the shaft 25 moving clockwise in the direction of the legend "close" indicated on cam 59. During this operation, the cam 59 being free to move is then frictionally carried along with cam 58, thus moving the wiper arm 39 back toward its center position to rebalance the circuit 12. The valve 20 will then be modulated over 25% of its range with respect to a point somewhere between its fully opened and 25% of its fully opened position. Thus, it is seen that the operative connections 16, together with the timing means 19, provide an adjustment of the valve 10 beyond the proportioning range of the system and immediately returns the valve to its proportional adjustment upon a reversal of direction of rotation of the motor 11. Thus, the valve 20 is reset with respect to its proportioning range, which corresponds to but a fraction of its total range of adjustment.

Assume now that the load on the system continues to decrease, causing a continuous increase in the temperature of the space which ultimately causes the wiper arm 32 to reach the left end of resistance 33. The wiper arm 39 is prevented from reaching its right end of resistance 38, since at this time the follower pin 60 engages the hook 78 of the cam curve 67. Consequently, the wiper arm 39 does not move sufficiently far to balance the circuit 12 to terminate operation of the motor 11. At this time, however, the abutment 79 engages switch 17 to open the same, thus terminating operation of the motor providing switch 80 is not at this time closed. Upon the next cycle of timing means 19, the switch 80 completes a circuit to motor winding 29 as follows: from the top side of secondary 48 through conductors 49 and 93, switch blade 51, contacts 52, 54, conductor 101, switch 55, conductor 102, a conductor 105, contacts 84, 82, a conductor 106, conductor 104, motor winding 29 and conductors 98 and 50 back to the secondary 48. Upon continuous increase in the temperature, timing means 19 intermittently energizes the motor 11 to provide continuous closing of the valve 10 until it reaches its fully closed position, at which time the edge 80 of cam 58 engages the follower pin 60 to provide additional rotation of shaft 41 in a clockwise direction. Abutment 79 then engages switch 55 to open the same, thus terminating operation of the motor 11. As previously pointed out in connection with the actuation of switch 57, the actuation of switch 55 occurs only under the conditions mentioned above. Thus, before the valve 20 reaches its fully closed position, a point is reached where the amount of heat supplied to the space is not sufficient to satisfy the losses therefrom. The wiper arm 32 then moves sufficiently far to the right to unbalance the circuit 12, which causes the motor 11 to move the wiper arm 39 back on to its proportioning range. With the latter reset, the valve 10 will now be modulated over 25% of its range with respect to a point somewhere between its fully closed and 33% of its fully opened position.

In practice, it has been found that in some systems where the lag is extremely small such as in the case of unit ventilators, for example, that the switches 17 and 18 and the timing means 19 may be entirely dispensed with. Since the motor operator shaft 25 moves relatively slowly, the movement of the motor itself provides, in effect, a time delay which corresponds approximately to the time lag of the system.

In Figure 3 a means is shown for providing an adjustment of the timing rate of the timing means 19 proportional to the departure of the thermostat 13 from the differential of the system. The arrangement in Figure 3 also provides means whereby the timing means is energized only when the thermostat approaches the limits of the differential. In addition to the resistance 33, two additional resistances 107 and 108 are added to the thermostat 13, each being disposed at the ends of the resistance 33. Resistance 107 is connected by a conductor 109 and resistance 108 is connected by a conductor 110 to conductor 90, which in this case is disconnected from the secondary 48. In this case, a somewhat longer wiper arm 111 is secured to the bimetal strip 31. Thus, when the wiper arm 111 moves sufficiently far towards the right end of resistance 33, the arm 111 engages the resistance 107 to complete a circuit to the heater 88 as follows: from the top side of secondary 48 through conductor 49, bimetal strip 31, wiper arm 111, resistance 107, conductors 109 and 90, switch 89, conductor 91, heater 88, and conductor 92 back to secondary 48. When the wiper arm 111 moves sufficiently far toward the left of resistance 33, it engages resistance 108, thus completing a circuit to the heater 88 as follows: from the top side of secondary 48 through conductor 49, bimetal strip 31, wiper arm 111, resistance 108, conductors 110 and 90, switch 89, conductor 91, heater 88, and conductor 92 back to secondary 48. It is obvious that in each case as the wiper arm 111 moves farther towards the right and left ends of resistance 107 and 108, respectively, the resistance in each circuit will be less, and accordingly, heater 87 will be more highly energized, thus producing a more rapid engagement of the switches 80 and 81. Also, because of the inherent lag in the bimetal 36, the "on" periods will be somewhat longer. Thus, the intermittent energization of the motor 11 will be more frequent and for longer periods of time as the temperature of the space departs to a greater extent beyond the limits of the differential, thereby facilitating a more rapid adjustment of the valve 10 in case of extreme load changes. It is obvious that by use of cone-shaped potentiometers 107 and 108 or other expedients, the timing rate of the timing means 19 may be made to vary proportionately with the current supplied to the heater 88.

From the foregoing, it is now obvious that I have provided apparatus well adapted for fulfilling the objects of my invention set forth hereinabove. While I have illustrated and described but a single embodiment of my invention which has been found to give satisfactory and reliable results in practice, it is to be understood that the same is susceptible of many embodiments involving numerous alternative structures. Accordingly, I contemplate all such further embodiments and modifications thereof which would naturally occur to those skilled in the art without departing from the spirit of the invention and the scope of the appended claims.

I claim as my invention:

1. In a control system, means for controlling the position of a device which controls the value of a condition to be maintained at a normal value comprising, in combination, motor means for adjusting the device, and control means including a follow-up means responsive to a condition indicative of a need for adjustment of the device for controlling operation of the motor means over a predetermined range of condition values corresponding to a fractional portion of the range of adjustment of the device, the motor means comprising a shaft operatively connected to the device, the follow-up means comprising a member and an element movable with respect thereto for performing the control function, operative connections between the shaft and the element for moving the element comprising a cam means frictionally secured to the shaft and a follower means for the cam means secured to the element, said control means being operable to cause continuous adjustment movement of said motor means when the departure of the condition from said normal value is within a predetermined range and intermittent adjustment movement when the departure of the condition from said normal value is beyond said predetermined range.

2. In a control system, means for controlling the position of a device which controls the value of a condition to be maintained at a normal value, comprising in combination, motor means for adjusting the device, control means including a follow-up means responsive to a condition indicative of a need for adjustment of the device for controlling operation of the motor means over a predetermined range of condition values corresponding to a fractional portion of the range of adjustment of the device, the motor means comprising a shaft operatively connected to the device, the follow-up means comprising a member and an element movable with respect thereto for performing the control function, said follow-up means being operable to terminate operation of said motor means when the control movement of said element is within a predetermined limit, operative connections between the shaft and the element for moving the element comprising a cam means frictionally secured to the shaft and a follower means for the cam means secured to the element, the arrangement between the cam and follower means being such that the follower means prevents further movement of the cam means when the element moves to positions corresponding to the limits of said predetermined range of values, and means actuable by the follower means for terminating operation of the motor means upon movement of the element to the limit positions thereof.

3. In a control system, means for controlling the position of a device which controls the value of a condition to be maintained at a normal value comprising, in combination, motor means for adjusting the device, control means including a follow-up means responsive to a condition indicative of a need for adjustment of the device for controlling operation of the motor means over a predetermined range of condition values corresponding to a fractional portion of the range of adjustment of the device, the motor means comprising a shaft operatively connected to the device, the follow-up means comprising a member and an element movable with respect thereto for performing the control function, operative connections between the shaft and the element for moving the element comprising a cam means frictionally secured to the shaft and a follower means for the cam means secured to the element, the arrangement between the cam and follower means being such that the follower means prevents further movement of the cam means when the element moves to positions corresponding to the limits of said predetermined range of values, and means actuable by the follower means for terminating operation of the motor means upon movement of the device to the limit positions thereof, said last named means including a second cam secured to the shaft and engageable with the follower means to prevent further relative movement of said shaft and said frictionally secured first cam means and to move said follower means when the device moves to the limit positions thereof.

4. A system of the class described, comprising in combination, motor means, a device positioned thereby and having a predetermined range of movement, means for operating said motor means including a controller and follow-up means having a predetermined range of movement, connections between said motor means and follow-up means including a frictionally mounted cam and a cam follower, said cam having a contour such that the follow-up means is operated through its complete range of movement upon movement of said device through only a portion of its range of movement, said follow-up means and controller being so arranged that the follow-up means functions to stop motor operation when said controller is subjected to a small deviation from its desired condition and is incapable of stopping motor operation when said controller is subjected to a large deviation from its desired condition, and means for preventing further movement of said cam after said follow-up means has been operated through its complete range of movement, whereby the motor means continues to drive said device while said cam remains stationary.

5. A modulating motor structure comprising in combination, motor means, a final driven member connected thereto and having a predetermined range of movement, follow-up means having a predetermined range of movement, means connecting said follow-up means and final driven member and including a frictionally mounted cam and a cam follower therefor, said cam and cam follower providing means for moving said follow-up means over its full range of movement and confining the movement of said final driven member to a selective portion of its range, and means to prevent further movement of said cam upon further movement of said motor means, whereby upon such further movement of said motor means the final driven member continues to move and the frictionally mounted cam remains stationary, but upon subsequent initial reverse movement of said motor means, the cam and final driven members both are moved in the reverse direction.

6. In a condition control system, in combination, a condition changing device, power means for operating said condition changing device, control means for said power means including a controller and a follow up mechanism having a predetermined follow up action corresponding to a predetermined change in the value of the condition to which said controller responds, connections between said power means and said follow up mechanism for operating said follow up mechanism, said connections being arranged to cause full movement of said follow up mechanism to a limit position upon less than full movement of said controller whereby a change in the value of the condition to which the controller responds which results in full movement of said follow up mechanism to a limit position causes less than full movement of said controller and less than full movement of said condition changing device, means for altering the extent of movement of said condition changing device relative to the full movement of said follow up mechanism, and means operable when said follow up mechanism has been moved to a limit position for causing additional movement of said condition changing device upon a further and larger change in the value of the condition to which said controller responds.

7. In a control apparatus, reversible motor means, a final driven element operably connected to said motor means, and a follow up mechanism also operably connected to said motor means, the connections between the said follow up mechanism and said motor means including a cam follower and a cam having a plurality of operating surfaces each of which has the same throw but each of which requires a different amount of movement to cause full movement of the cam follower in respect to such surface whereby the follow up mechanism is operated to its full extent upon cooperation of said follower with any of said cam surfaces but the amount of movement of the reversible motor means to bring about such complete follow up action is different when the cam follower is cooperating with different ones of the cam surfaces.

8. In a control apparatus, reversible motor means, a final driven element operably connected to said motor means, control means responsive to condition changes for controlling the operation of said motor and the positioning of said final driven element, said control means being operable upon a condition change within a predetermined range to cause the positioning of said final driven element in a continuous movement and upon a condition change beyond said predetermined range to cause the positioning of said final driven element in a series of intermittent movements, and means in association with said control means for selectively altering the extent of movement of said final driven element relative to a condition change within said predetermined range.

9. In control apparatus for a condition changing means comprising, in combination, power operated means for controlling the operation of said condition changing means, control means for said power means, said control means including a controller capable of controlling said power means in response to a predetermined range of values of the said condition, said control means also including a follow-up mechanism, means connecting said follow-up mechanism to said power means for operation thereby, means limiting the follow-up range of said mechanism to a fractional portion of the said predetermined range of the controller without restricting operation of said power means, and means made operative as an incident to the limiting of said follow-up mechanism for controlling operation of the said power means as said controller responds to condition values beyond the limited range of said follow-up mechanism.

10. In control apparatus for condition changing means, in combination, power operated means for adjusting the condition changing ability of said condition changing means, control means for said power operated means including a controller and a follow-up mechanism, said controller being capable of responding to a predetermined range of values of the said condition, means connecting said follow-up mechanism to said power operated means for operation thereby so that said mechanim may follow up the action of said controller, means limiting the range of operation of said follow-up means to a fractional portion of the said predetermined range of the controller, and means made operative as an incident to the limiting of operation of the said follow-up mechanism for controlling said power operated means as said controller responds to condition values beyond the said fractional portion of the predetermined range to which the controller responds.

11. In control apparatus for a condition changing device, in combination, power means for adjusting said device, control means for said power means including a controller and a follow-up mechanism, means connecting said follow-up mechanism to said power means for operation of said mechanism through its full range to limit positions in response to operation of the said controller through only a fractional portion of its range, and means made operative as a consequence of said follow-up mechanism reaching a limit position for causing additional adjustment of said condition changing device upon further and larger changes in the value of the condition to which the controller responds.

12. In control apparatus for an adjustable condition changing means, in combination, power means for adjusting said changing means, means for controlling said power means including a controller and a follow-up mechanism, said controller being capable of responding to a predetermined range of values of said condition, means connecting said mechanism to said power means for operation thereby, the follow-up range of said mechanism being only a fractional portion of said predetermined range of the controller, means connecting said controller and follow-up mechanism into controlling relation to said power means for proportionally controlling said power means until a limit of adjustment of said follow-up mechanism is reached, and additional means made operative as an incident to the said limiting adjustment of said follow-up mechanism for cooperating with said controller to control said power means in response to condition values beyond the said fractional portion of the predetermined range of the controller.

SIEGFRIED G. ISSERSTEDT.

REFERENCES CITED

The following references are of record in the file of this patent:

UNITED STATES PATENTS

| Number | Name | Date |
| --- | --- | --- |
| 2,109,062 | Fisher | Feb. 22, 1938 |
| 1,921,172 | Taylor et al. | Aug. 8, 1933 |
| 1,564,804 | Warren | Dec. 8, 1925 |
| 2,365,709 | Lilja | Dec. 26, 1944 |
| 2,251,483 | Denison et al. | Aug. 5, 1941 |